July 23, 1968  L. J. WALL  3,393,695
LUBRICATED BIASED CONTROL VALVE
Filed Oct. 22, 1965

INVENTOR.
LAMAR J. WALL
BY
Alan M. Staubly
ATTORNEY

United States Patent Office 3,393,695
Patented July 23, 1968

3,393,695
LUBRICATED BIASED CONTROL VALVE
Lamar J. Wall, Seal Beach, Calif., assignor to Honeywell Inc., Minneapolis, Minn., a corporation of Delaware
Filed Oct. 22, 1965, Ser. No. 501,434
3 Claims. (Cl. 137—246)

This application is concerned with the design of a control device in the form of a rotary valve and, more particularly, to a safety pilot gas valve of the rotary disc valve type disclosed in a co-pending application of Keith T. Krueger, Ser. No. 455,912, filed May 14, 1965, and entitled "Control Device." This invention is an improvement over the Krueger invention in that it provides for a better sealing of the valve and a dampening of the return movement of the valve from its "on" position to its "off" position and, additionally, provides for a more uniform distribution of the strain in the spring for returning the valve to the "off" position.

FIGURE 1 of the drawing illustrates the invention in an elevational view thereof with portions thereof broken away;

Figure 1:
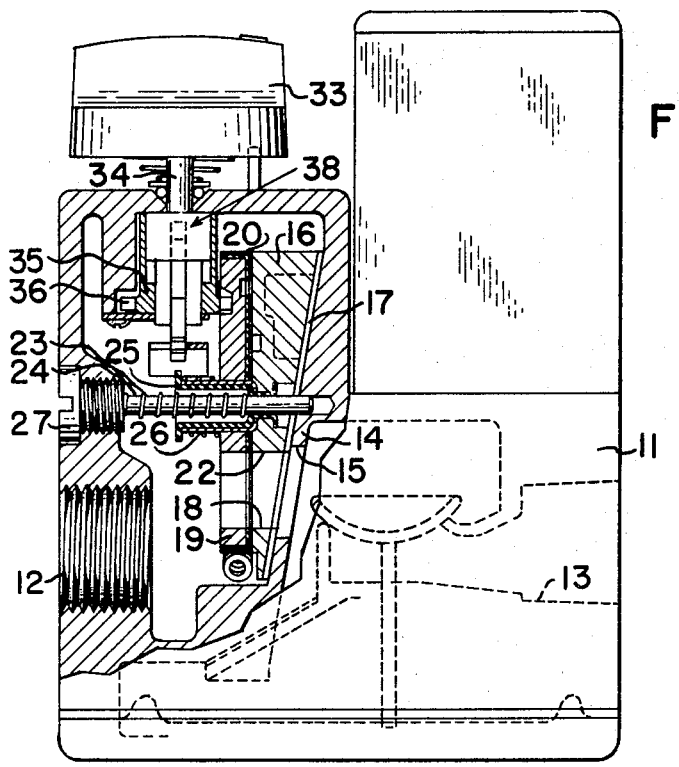
Figure 3:
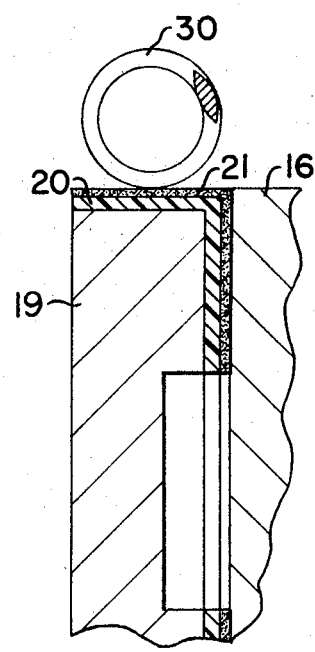
FIGURE 3 is an enlarged fragmentary view showing the rotary valve and its cooperating valve seat in more detail.

The reference numeral 11 designates a manifold valve body having a threaded inlet 12, a threaded outlet 13 and a partition wall 14 therebetween. The wall 14 is apertured at 15 to establish communication between the inlet 12 and the outlet 13. A valve seat member 16 overlies the partition wall 14, with a sealing gasket therebetween and is apertured at 18 in alignment with the opening 15 in the partition wall. A rotary disc valve 19 has a coating of a solid dry lubricating material 20, which may be a product known as "Teflon," around the periphery thereof as well as on the side of the disc which bears against the valve seat member 16. This coating provides an easily formed mating member for the seat and which is also a durable lubricant. In addition to the dry coating 20, a fluid lubricant 21, which may be a silicon oil or grease, covers the outer surface of the dry lubricating coating. While the dry lubricant 20 could serve sufficiently well as a lubricating surface between the disc valve and the valve seat, the fluid lubricant serves the function of additional lubricant, sealing against gas leakage, and dampening of the relative movement between the disc valve and the seat. The disc valve has an aperture 22 therein which is adapted to register with the aperture 18 in the "on" position of the valve and be out of registration therewith in the "off" position thereof.

Figure 2:
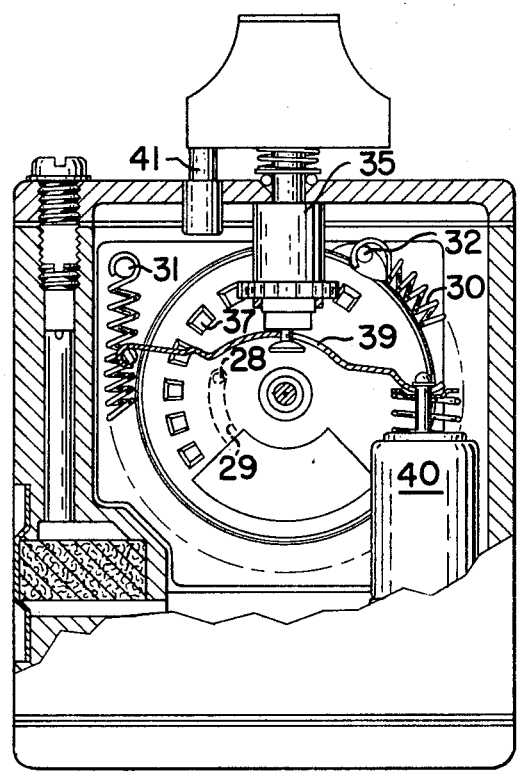
FIGURE 2 is an end view of the invention with portions thereof broken away.

The valve seat 16 is resiliently held against the partition wall 14 by means of a coil spring 23 surrounding a stem 24 that extends through the disc valve and through the valve seat member 16 and into the partition wall 14. The disc valve and the valve seat member 16 are secured together by means of a hollow rivet member 25. A coil spring 26 extends between an outwardly extending flange on the rivet member and the disc valve to resiliently bias the disc valve against the valve seat member. The stem 24 is an extension of a threaded plug 27 which is screw threaded into a threaded bore through the valve body, in axial alignment with the bore in the partion wall. A pin 28 extends from the valve seat member into an arcuate groove 29 formed in the surface of the rotary disc and which terminates in the aperture 22, to serve as a stop for the rotary valve in its "off" and "on" positions, the pin engaging the right hand end of the aperture 22, as illustrated in FIGURE 2 of the drawing, in the "off" position.

While the disc valve and the valve seat member and the valve body may additionally provide for the control of pilot burner gas, as in the above-mentioned invention of Krueger, the details thereof are immaterial for an understanding of this invention. Therefore, these details are not described herein and may be formed in the above-identified application of Krueger. Likewise, the details of the actuating mechanism for manually moving the disc valve from its "off" position to its "on" position and "pilot" position are immaterial to this invention, so will not be described in detail herein. Suffice it to say that these details are the same as those disclosed in the above-mentioned Krueger application.

Briefly, the actuating means for the disc valve consists of a coil tension spring 30 which is anchored at one end on a pin 31 secured to the valve body and at its other end on a pin 32 secured to the disc valve. The intermediate coils of the spring are wrapped around and bear against the lubricating surfaces on the edge of the disc valve. This spring is constantly in tension and normally holds the disc valve in its "off" position. A manually operable knob 33 has a stem 24 which extends through the upper wall of the valve housing and is connected through a latching mechanism to a ring gear 35. The gear 35 has teeth 36 thereon that mesh with teeth formed by the recesses 37 in the disc valve. The latching mechanism, generally designated by the reference numeral 38, is fully described in the above-mentioned Krueger application and is controlled by a lever 39 in response to the energization and de-energization of an electromagnet 40. The magnet is of the type that is energized by a thermocouple responsive to the presence or absence of a pilot flame at a main burner in a conventional manner.

In the operation of the valve described above, the manual knob is rotated to turn the gear 35 through the latching mechanism and thereby rotate the disc valve to its "on" position by stretching the tension spring 30. If it were not for the dry lubricating coating 20, aided by the fluid lubricant 21, most of the strain on the spring 30 would be absorbed by the portion thereof between the pin 31 and the first few coils or loops of the spring that engage the valve. By the use of these lubricants, the strain on the coil 30 is distributed substantially uniformly through all of the coils or loops of the spring and, thereby, provides for more uniform operation of the valve and a greater life for the spring. Once the valve has been moved to its "on" position, yieldable means 41, which may be in the form of a spring bias detent, holds the knob and the valve in the "on" position so long as the latching mechanism is in a condition indicative of the fact that the pilot burner is burning and generating sufficient current to energize the magnet 40. Upon pilot flame failure, the magnet 40 releases the lever 39 to operate the latching mechanism 38 to release the gear 35 from the knob and free the valve to move to its "off" position under the bias of spring 30. If it were not for the fluid 21 between the dry lubricant 20 and the valve seat member, the disc valve would rotate so rapidly under the bias of the spring that damage would result to the pin 28, with the possibility of eventual failure. Besides the possible damage to the valve mechanism, a sharp blow on the pin by the valve would cause an objectionable noise which would carry through the pipes of the heating system so as to render the valve impractical to use from that standpoint. It is thus seen that by the use of the fluid lubricant in addition to the dry lubricant, the dual function of sealing and dampening of movement of the valve is accomplished, which is a highly desirable improvement over the invention as disclosed in the Krueger application.

While I have illustrated the preferred embodiment of the invention, it is deemed obvious that variations may be made therein without departing from the spirit of the invention. For example, the valve seat member 16 could be made integral with the partition wall 14, eliminating the gasket 17 and providing for pilot gas flow through some other means. The following claims are intended to cover this modification. Therefore, the scope of the invention should be determined from the appended claims.

I claim:

1. A valve comprising a valve body with an inlet and an outlet and an apertured valve seat member therebetween; an apertured rotary valve member movable between an "off" position and an "on" position; solid dry lubricating material extending around a peripheral portion of said rotary valve member; means resiliently biasing said rotary valve member against said valve seat member; means for moving said valve member to its "on" position from its "off" position; and a coiled tension spring means bearing against said peripheral portion for returning said valve member to its "off" position.

2. A valve as defined in claim 1 in combination with condition responsive means for releasably holding said rotary valve member in its "on" position.

3. A valve as defined in claim 1, in combination with fluid between said members wherein said fluid is of such viscosity that it serves to seal said members against leakage and to dampen the return movement of the rotary valve member.

References Cited

UNITED STATES PATENTS

| | | | |
|---|---|---|---|
| 2,539,636 | 1/1951 | Runge | 137—246.23 |
| 3,275,237 | 9/1966 | Kolze | 251—313 X |
| 3,292,652 | 12/1966 | Gallone | 137—246 |

CLARENCE R. GORDON, *Primary Examiner.*